March 18, 1924.
E. STOLPE
SNAP HOOK FOR TIRE CHAINS
Filed April 10, 1922
1,486,993
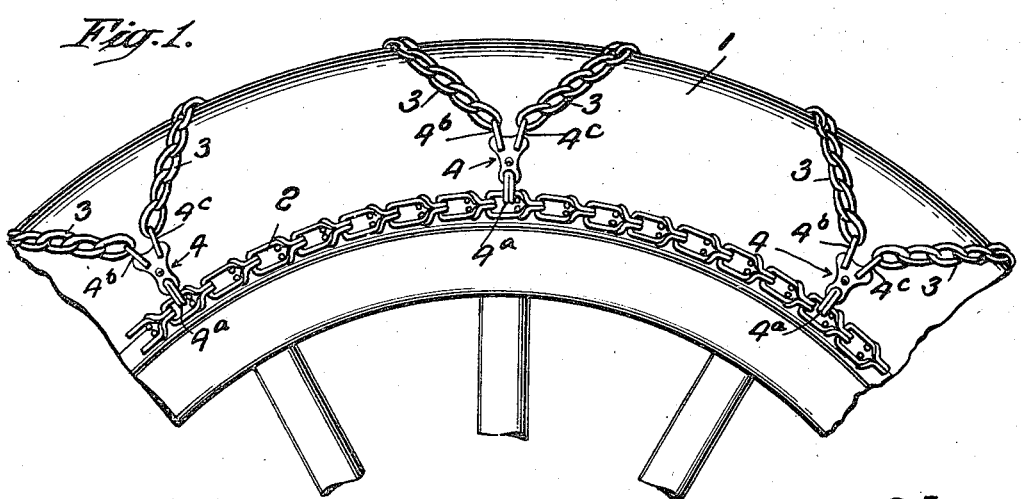
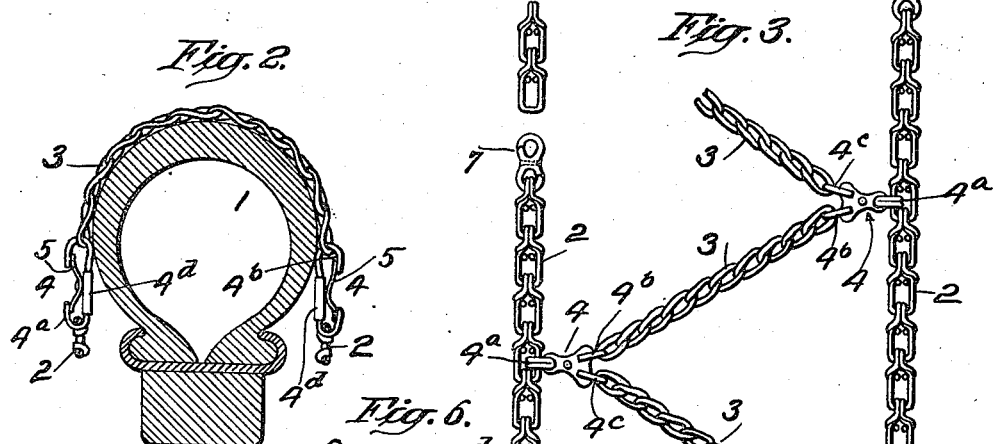
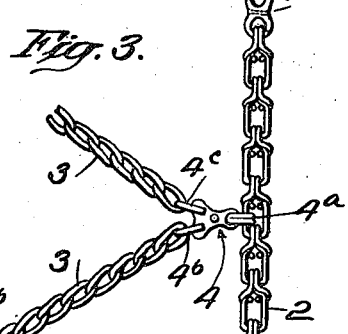
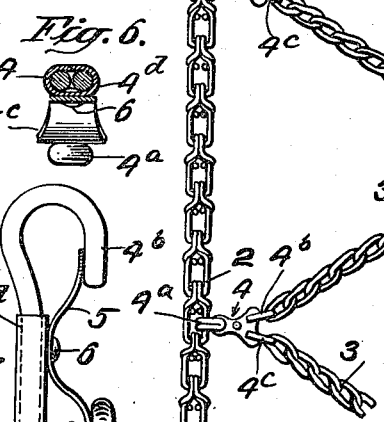
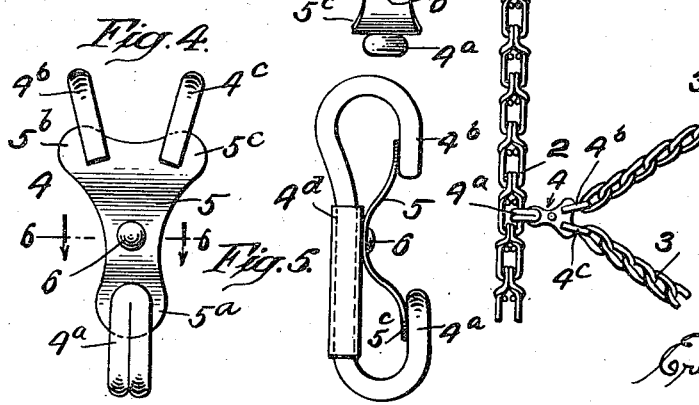
INVENTOR
Eric Stolpe
BY
Joseph F. O'Brien
his ATTORNEY Patented Mar. 18, 1924.

1,486,993

UNITED STATES PATENT OFFICE.

ERIC STOLPE, OF YONKERS, NEW YORK.

SNAP HOOK FOR TIRE CHAINS.

Application filed April 10, 1922. Serial No. 551,017.

*To all whom it may concern:*

Be it known that I, ERIC STOLPE, a subject of the King of Sweden, and a resident of Yonkers, county of Westchester, city and State of New York, have invented certain new and useful Improvements in Snap Hooks for Tire Chains, of which the following is a specification.

This invention relates to improvements in snap hooks for tire chains, and is especially adapted for use upon pneumatic or cushion tires.

The principal objects of this invention are the provision of snap hooks in connection with anti-slipping elements, such as the short cross-chains in diagonal positions across the tire so as to procure the most effective anti-slipping effect of such cross-chains, and at the same time use less chain in such an anti-slipping attachment for any given size of tire than has heretofore been used when such diagonally-disposed cross-chains have been used; to enable a ready, quick and independent connection or release of any one of the diagonally-disposed cross chains without disturbing any other cross-chain; to produce a construction in which two of these chain sections radiating in opposite directions may be connected to a snap hook having radiating prongs which enable the spacing of the cross chains at the base and which will furthermore enable the quick and ready snap-hook connection of two cross-chains to one of the side retaining chains; and to produce the main or body part of such a snap-hook connecting member from a single rod or strand of wire.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a side elevation of a portion of a wheel showing a non-skid or anti-slipping attachment applied thereto.

Fig. 2 is a cross-section of a tire and rim with the non-skid element hung loosely thereon;

Fig. 3 is a fragmentary top plan view of the non-skid or anti-slipping attachment removed from the tire;

Fig. 4 is a top or plan view of the connecting element for the side and diagonal chains;

Fig. 5 is a side view of the connecting element shown in Fig. 4; and

Fig. 6 is a section on the line 6—6 of Fig. 4.

Referring now to these drawings, which illustrate a preferred embodiment of my invention, 1 indicates a tire of any desired type to which is applied an anti-slipping or non-skid attachment embodying my invention. The anti-slipping attachment shown is formed with side chains 2—2 which are connected together by a series of diagonally disposed identical chains 3. The opposite ends of two of these chains are connected to the side chains by means of a V or triangular shaped connecting element 4 which is formed with three hooks at its corners, thus one end of the element 4 is provided with a hook $4^a$ which is connected to one of the side chains 2 and the opposite end is provided with two oppositely disposed and diagonally arranged hooks $4^b$—$4^c$, respectively, to which hooks are connected the ends of two diagonally disposed chains 3. The connecting element 4 is preferably formed of a strand of wire or rod and the body of the hook $4^a$ is formed by bending this wire intermediate its ends to produce a hook $4^a$, and the opposite ends of this strand are then bent diagonally in opposite directions to form the hooks $4^b$—$4^c$. Suitable means is preferably provided for holding the two strands together and for this purpose I have shown a sleeve $4^d$. The connecting elements so formed are preferably provided with a leaf spring 5 which, as shown, is connected by a rivet 6 to the sleeve $4^d$ and has terminal ends $5^a$—$5^b$—$5^c$ extending into contact with the hooks $4^a$—$4^b$—$4^c$ so as to close the same and provide a snap hook arrangement with each of the same.

Any suitable means for connecting the ends of the side chains together is employed and, as illustrated, I have provided an open ended link 7 for this purpose. Obviously, however, any other suitable means may be employed for the purpose of attaching these chains and for tightening the same when necessary. In applying this attachment to wheels the side of the connecting element 4 having the single hook is snapped in place on the chains 2. The diagonal chain sections may be left in connection with the element 4 so as to properly space the sections thereof and the opposite end 4ᵃ of said hook may be snapped in place upon the chains 2 after which the chains 2 may be tightened in any suitable way, or if desired all the chains may be connected in substantially the positions shown in Fig. 3 and connected to the vehicle tire simply by connecting the ends of the side chains 2 and tightening the same up in any suitable way.

Having described my invention, I claim:—

1. A snap-hook for tire chains embodying, in combination, a triangular-shaped connecting member having at two of its angles a pair of snap hooks for engaging and separating cross-chain sections and a single snap hook at its other angle for engaging a side chain.

2. A snap-hook for tire chains embodying, in combination, a triangular-shaped connecting member having a body portion formed of a single strand or rod of wire bent to form intermediate its ends a single hook for engagement with a side chain, and two additional hooks at its opposite ends for engaging and separating two cross chains, and a single spring snap member for simultaneously closing all of such hooks.

In witness whereof, I have signed my name to the foregoing specification in the presence of two subscribing witnesses.

ERIC STOLPE.

Witnesses:
  HELEN V. WHIDDEN,
  JULIUS M. LUTZ.